(12) United States Patent
Ono et al.

(10) Patent No.: US 8,631,265 B2
(45) Date of Patent: Jan. 14, 2014

(54) SYNCHRONIZATION CIRCUIT THAT FACILITATES MULTIPLE PARALLEL READS AND WRITES

(75) Inventors: Tarik Ono, Cupertino, CA (US); Mark R. Greenstreet, Vancouver (CA)

(73) Assignee: Oracle International Corporation, Redwood Shores, CA (US)

( * ) Notice: Subject to any disclaimer, the term of this patent is extended or adjusted under 35 U.S.C. 154(b) by 419 days.

(21) Appl. No.: 12/966,888

(22) Filed: Dec. 13, 2010

(65) Prior Publication Data

US 2012/0151243 A1 Jun. 14, 2012

(51) Int. Cl.
 *G06F 1/12* (2006.01)
 *G06F 13/42* (2006.01)
 *G06F 5/00* (2006.01)
 *G06F 7/00* (2006.01)
 *G06F 3/00* (2006.01)

(52) U.S. Cl.
 USPC .................................. 713/400; 710/1; 710/57

(58) Field of Classification Search
 USPC ......................................................... 713/400
 See application file for complete search history.

(56) References Cited

U.S. PATENT DOCUMENTS

| 6,226,698 B1* | 5/2001 | Yeung et al. ..................... 710/57 |
| 2001/0054121 A1* | 12/2001 | Proch et al. ..................... 710/57 |
| 2002/0188767 A1* | 12/2002 | Ehmann ........................... 710/1 |
| 2003/0123588 A1* | 7/2003 | Parikh ........................... 375/354 |
| 2005/0160245 A1* | 7/2005 | Artieri .......................... 711/167 |
| 2006/0222017 A1* | 10/2006 | Quiroga et al. ............... 370/503 |
| 2009/0244993 A1* | 10/2009 | Udell et al. .................. 365/193 |
| 2011/0057690 A1* | 3/2011 | Akita ............................ 327/144 |

* cited by examiner

*Primary Examiner* — Kim Huynh
*Assistant Examiner* — Brandon Kinsey
(74) *Attorney, Agent, or Firm* — Park, Vaughan, Fleming & Dowler LLP; Mark Spiller (57) ABSTRACT

The disclosed embodiments provide a synchronization circuit that supports multiple parallel reads and writes. This synchronization circuit includes multiple coupled data storage locations that synchronize data and control signals between two time domains and control logic that facilitates simultaneously accessing a variable number of such data storage locations in the same clock cycle. During operation, the synchronization circuit receives a request to simultaneously access (e.g., read and/or write) two or more synchronized data storage locations. In response to the request, the control logic in the synchronization circuit determines whether the present state of the synchronization circuit can accommodate the request, and if so, simultaneously accesses two or more synchronized data storage locations.

20 Claims, 8 Drawing Sheets

SYNCHRONIZATION CIRCUIT THAT FACILITATES MULTIPLE PARALLEL READS AND WRITES

BACKGROUND

1. Field of the Invention

This disclosure generally relates to circuits and techniques for synchronizing signals. More specifically, this disclosure relates to circuits and techniques for synchronizing signals among different time domains in a manner that supports a variable number of parallel reads and writes.

2. Related Art

Clock signals are often distributed globally over an entire integrated circuit. However, as clock frequencies and the number of transistors on an integrated circuit continue to increase, implementing such global clock signals becomes increasingly difficult. Moreover, integrated circuits commonly contain different functional blocks that operate at different speeds. Consequently, many integrated circuits include multiple timing domains. In such integrated circuits, synchronizers are often used to interface the different timing domains.

Synchronizing first-in/first-out queues (also referred to in this document as synchronizing FIFOs or sometimes simply FIFOs) are often used to communicate between two different timing domains. Many common implementations of synchronizing FIFOs use Gray-encoded pointers, which ensure that the synchronizer always has a valid value. Although synchronizing FIFOs that use Gray-encoded pointers can effectively synchronize individual reads and writes from a FIFO, they do not support synchronized accesses that simultaneously access multiple values in the FIFO. One problem with supporting such simultaneous accesses is that incrementing a Gray-encoded pointer by more than one may result in invalid values being sampled.

Hence, what is needed are synchronization techniques that support simultaneous accesses without the above-described problems.

SUMMARY

The disclosed embodiments provide a synchronization circuit that supports multiple parallel reads and writes. This synchronization circuit includes multiple coupled data storage locations that synchronize data and control signals between two time domains and control logic that facilitates simultaneously accessing a variable number of such synchronized data storage locations in the same clock cycle. During operation, the synchronization circuit receives a request to simultaneously access (e.g., read and/or write) two or more synchronized data storage locations. In response to the request, the control logic in the synchronization circuit determines whether the present state of the synchronization circuit can accommodate the request, and if so, simultaneously accesses two or more synchronized data storage locations in a single clock cycle of the requesting time domain.

In some embodiments, the ordering of data that is stored in the synchronization circuit is not affected by requests that simultaneously access multiple synchronized data storage locations.

In some embodiments, each synchronized data storage location includes two one-bit synchronizers that indicate to the two time domains whether the synchronized data storage location is empty or full.

In some embodiments, the synchronization circuit uses a redundant representation to track whether the set of synchronized data storage locations are full or empty. For instance, the redundant representation may combine the outputs of the one-bit synchronizers for the synchronized data storage locations into a unary vector that is used by the synchronization circuit to determine whether an access request can be accommodated.

In some embodiments, the outputs of multiple one-bit synchronizers for synchronized data storage locations that are being accessed may update at different times. Hence, upon receiving a subsequent request that targets a specific synchronized data storage location, the control logic for the synchronization circuit may inspect additional bits in the unary vector that are associated with other synchronized data storage locations to determine whether the targeted synchronized data storage location can accommodate the subsequent request. Alternatively, in other embodiments, the synchronization circuit may only inspect the synchronizer bits for the targeted synchronized data storage location(s), and delay the subsequent request until the output bit for the targeted synchronized data storage location(s) indicates that the subsequent request can be accommodated.

In some embodiments, each synchronized data storage location is configured with a number of access ports that corresponds to the maximum number of synchronized data storage locations that can be simultaneously accessed in a clock cycle.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a non-transitory computer-readable storage medium, which may be any device or non-transitory medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), a dedicated or shared processor that executes a particular software module or a piece of code at a particular time, and/or other programmable-logic devices now known or later developed. When the hardware modules are activated, the hardware modules perform the methods and processes included within the hardware modules.

Synchronizing FIFOs

Figure 1:
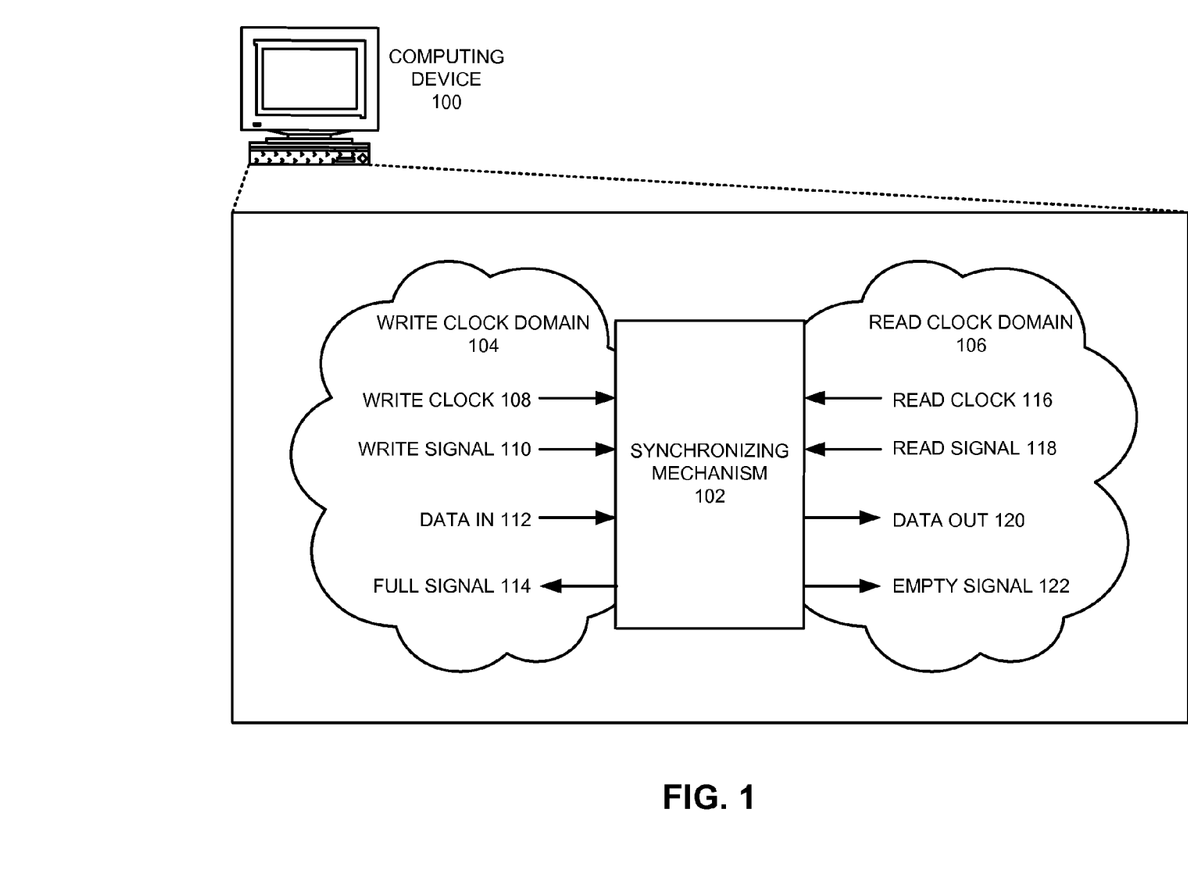
FIG. 1 illustrates an exemplary synchronizing mechanism that synchronizes communication between two different timing domains in accordance with an embodiment.

FIG. 1 illustrates a computing device 100 that includes an exemplary synchronizing mechanism 102 (e.g., a synchronizing FIFO) that synchronizes communication between two different timing domains, write clock domain 104 and read clock domain 106. A transmitter (not shown) in write clock domain 104 that wants to transmit data to a receiver (not shown) in read clock domain 106 first checks full signal 114 to ensure that data can be written into synchronizing mechanism 102. If so, the transmitter provides input data 112 and asserts write signal 110. Synchronizing mechanism 102 receives and stores this data in the time frame of write clock 108, and provides a synchronized notification to the read clock domain 106 that data is available. For instance, synchronizing mechanism 102 can de-assert empty signal 122 when storing synchronized data, to signal to the receiver that data is available. The receiver can then assert read signal 118 to read synchronized data out 120 in the time frame of read clock 116.

Synchronization FIFOs strive to ensure that: synchronized data only arrives at certain well-defined times; the receiver receives data in same order the data was transmitted (e.g., first-in, first-out); and no invalid data is read. The use of two independent clocks makes it impossible to guarantee that there will be no errors (e.g., due to metastability failures, etc.), but the structure can be engineered to ensure with sufficiently high probability that data transfers will be "correct" (e.g., ensuring that the mean time between failures is greater than the lifetime of the device). A synchronizing FIFO failure occurs when either a valid entry in the FIFO is overwritten (for example by an erroneous write to a full FIFO), or when invalid data is read from the FIFO (for example by reading from an empty FIFO).

Many implementations of synchronizing FIFOs use pairs of Gray-encoded pointers, where a write pointer indicates the next FIFO position that will be written and a read pointer indicates the next FIFO position that will be read. When the two pointers point to the same location, the FIFO is either full or empty. However, because the two pointers are in different time domains, they need to be synchronized before they can be compared. For example, to determine whether the FIFO is full, the read pointer (which changes with respect to the read clock in the read clock domain) has to pass through a synchronizer before being compared to the write pointer in the write clock domain. Such synchronizers are typically associated with a delay of between 1 and 3 clock cycles.

The advantage of using Gray-encoded pointers is that only a single bit changes every time the pointer advances by one. A synchronizer for a specific bit value can be implemented so that the probability of the synchronizer failing to output a valid, digital value is arbitrarily small (albeit still greater than zero). If a FIFO uses Gray-code counters, exactly one bit of the counter changes each time the counter increments, and thus there is only one bit for any given transition that is susceptible to metastability. Regardless of whether the synchronizer for that one bit settles to the old value or the new one, the counter value output by the synchronizer is valid. Thus, FIFOs that use Gray-code counters can be made to be very robust against metastability failures.

For example, the sequence "0,1,2,3,4,5,6,7" can be encoded in a 3-bit Gray code as follows: "[000],[001],[011], [010],[110],[111],[101],[100]"; each time the value is incremented, a single bit changes. In contrast, consider an example where having more than one bit change in a binary-encoded write pointer can lead to failure. A synchronizer in the read clock domain may sample a binary-encoded write pointer just as the pointer changes from [0,1,1] (the value three) to [1,0,0] (the value four). Tiny timing differences between the update times of each pointer bit may cause the synchronizer to sample the write pointer when some, but not all, of the bits have changed. For example, if the right-most bit changes a bit later than the other bits, this might result in the synchronizer sampling the value [1,0,1] (the value five). If the comparator in the read clock domain side compares this invalid pointer value to the write pointer, it might incorrectly assume that there is data in the FIFO at position five and read out invalid data.

Figure 2:
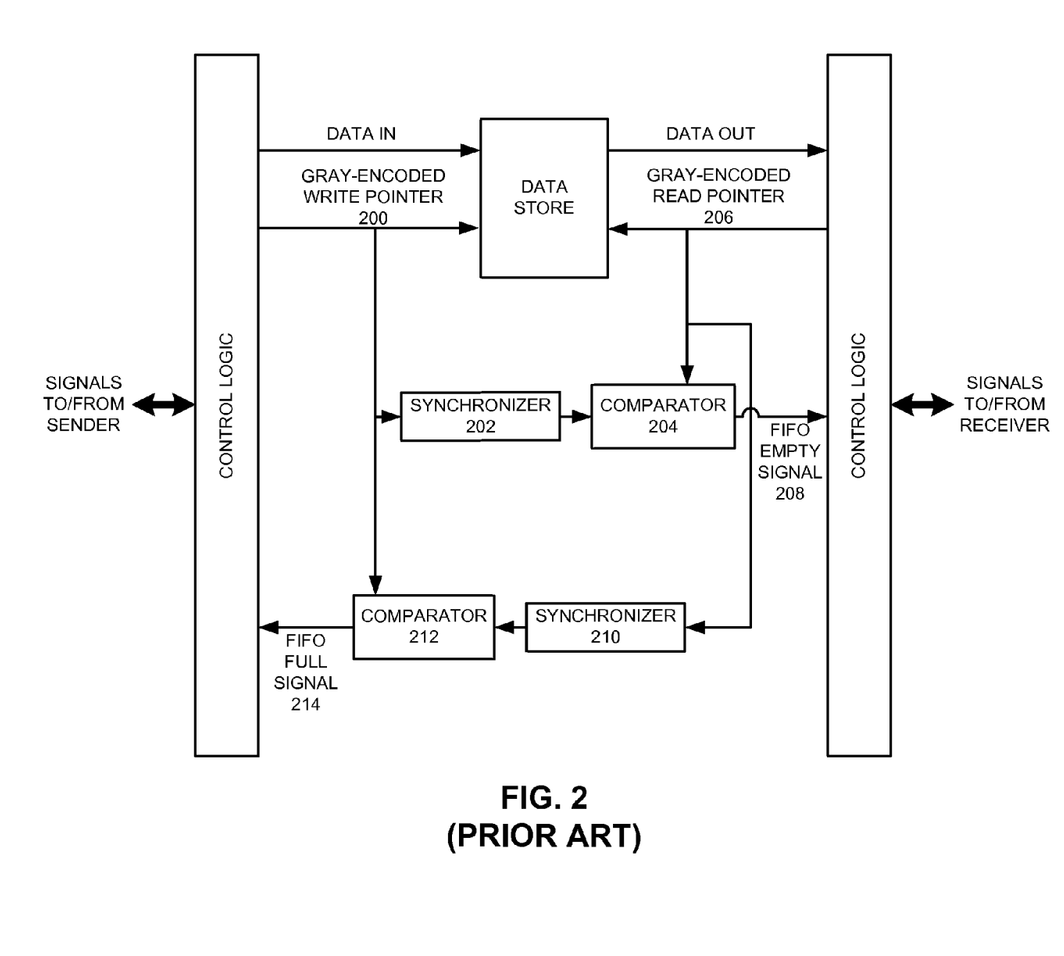
FIG. 2 illustrates an existing synchronizing FIFO that uses Gray-encoded pointers.

FIG. 2 illustrates an existing synchronizing FIFO that uses Gray-encoded pointers. As described above, a Gray-encoded write pointer 200 passes through synchronizer 202 before being compared with a Gray-encoded read pointer 206 in comparator 204. Based on the pointer values received, comparator 204 determines whether to assert a FIFO empty signal 208 to the control logic of the read clock domain. Similarly, Gray-encoded read pointer 206 passes through synchronizer 210 before being compared with write pointer 200 in comparator 212. Based on the pointer values received, comparator 210 determines whether to assert a FIFO full signal 214 to the control logic of the write clock domain.

Need for Synchronizing Structures that Support Variable, Parallel Accesses

There are many synchronized interfaces in electronic systems where the unit of transfer may be greater than one and/or multiple pieces of data arrive at once. For instance, such interfaces include, but are not limited to, the interfaces between: processors and memory devices; different processors (e.g., a graphics processor and a general purpose processor); and different modules with separate clock domains on a single chip (e.g., a "system-on-a-chip" design that integrates a number of modules which are often designed independently and operate using different clocks). For example, a memory may periodically send large blocks of data to a processor, and the processor then reads this data from a synchronizing FIFO in smaller units of data, but at a much higher clock rate. Or, in another example, parallel hardware structures may be used to send or receive multiple pieces of data at once to increase the bandwidth across the synchronizing FIFO without increasing clock rates. In general, there are many scenarios where reading or writing multiple elements from or to a synchronizing FIFO is desirable. In many instances, it is also desirable to be able to read or write a variable number of elements in each clock cycle.

Note, however, that while synchronizing FIFOs that use Gray-encoded pointers facilitate synchronizing individual reads and writes from a FIFO, they do not support synchronized accesses that simultaneously access multiple (or a variable number of) values in the FIFO. The beneficial properties of Gray codes are lost when the increment can vary in size, and thus can result in invalid values being sampled (as described for binary counters above).

However, a synchronizing FIFO with per-stage synchronizers (as described in pending U.S. patent application Ser. No. 12/193,609, entitled "Adaptive Synchronization Circuit," by the same authors, filed on Aug. 18, 2008, the contents of which are herein incorporated by reference) can be configured to allow multiple FIFO stages to be written to and/or read from simultaneously. Unlike traditional pointer-based FIFOs, in which FIFO fullness or emptiness is determined by comparing read and write pointers, the robustness of the synchronization in a FIFO with per-stage synchronizers is not affected by having multiple stages change from full to empty (or vice versa), because no "wrong" (e.g., invalid) data can be sampled.

Figure 3:
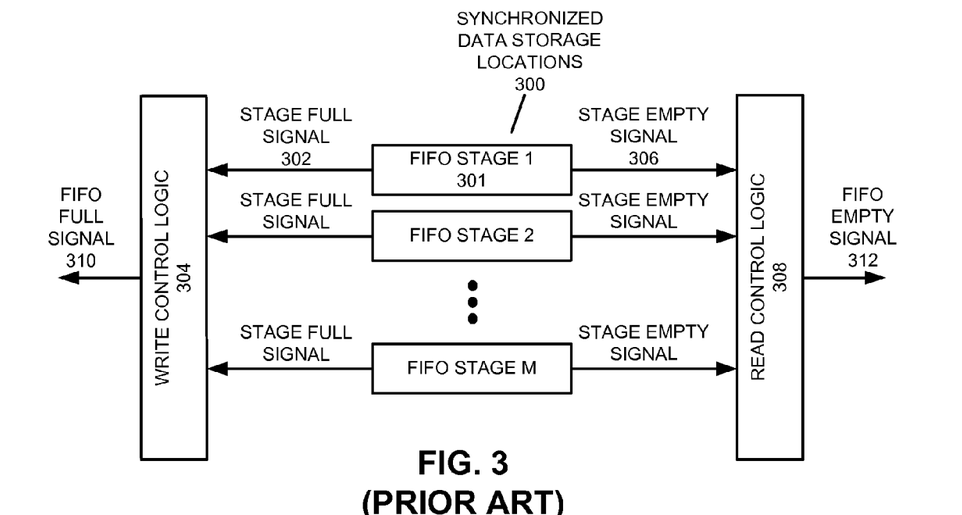
FIG. 3 illustrates an existing synchronizing FIFO in which each of the synchronized FIFO stages includes two one-bit synchronizers (synchronizers not shown).

FIG. 3 illustrates a synchronizing FIFO in which each of the synchronized data storage locations 300 (sometimes also referred to as synchronized FIFO stages or "synchronization stages") includes two one-bit synchronizers (not shown in FIG. 3, but illustrated and described in pending U.S. patent application Ser. No. 12/193,609, referenced above). Each synchronized data storage location is a data-holding element that stores one FIFO word, where a word may be defined to hold any number of bits (e.g., 8 bits, 128 bits, etc.). For example, a synchronized FIFO with 16 stages can store up to 16 such words.

In FIG. 3, each FIFO stage uses one synchronizer to convey FIFO stage fullness to the receiver's clock domain and the other synchronizer to convey FIFO stage emptiness to the transmitter's clock domain. Note that the synchronizers do not determine whether the data storage unit in a FIFO stage is empty or full, but instead convey transitions of stage state that were triggered by events in one clock domain to the other clock domain. For instance, a flip-flop and/or other associated logic gates may be used to track (and store) the actual stage state that is conveyed by the two synchronizers.

When receiving a write, FIFO stage 301 sets a stage full signal 302 that is received by the write control logic 304, and sends a synchronized signal to read control logic 308 that FIFO stage 301 is no longer empty. When FIFO stage 301 contains a value, and is read, FIFO stage 301 sets a stage empty signal 306 that indicates to the read control logic 308 that FIFO stage 301 is empty, and sends a synchronized signal to write control logic 304 that FIFO stage 301 is no longer full. Write control logic 304 ensures that FIFO full signal 310 is low only when at least one FIFO stage is empty, thus ensuring that a write can be performed without overwriting unread data. Due to the latency of the per-stage synchronizers, FIFO full signal 310 may continue to be asserted (i.e. high) for a few cycles after a stage goes empty, but this does not compromise the correct operation of the circuit. Likewise, FIFO read control logic 308 ensures that FIFO empty signal 312 is low only when at least one FIFO stage is full, thereby ensuring that valid data can be read. Note that a FIFO stage signals a change to stage full based on the write clock, and signals a change to empty based on the read clock.

Embodiments of the present invention involve structures and techniques that facilitate synchronizing signals among different time domains in a manner that supports a variable number of parallel reads and/or writes.

Synchronizing FIFOs that Facilitate Variable, Parallel Accesses

The previous section describes a synchronizing FIFO with per-stage synchronizers that can indicate whether each FIFO stage is empty or full. In some embodiments, such synchronized FIFO stages are used to build a synchronized FIFO that allows any number of FIFO stages to be read from or written to simultaneously.

Figure 4:
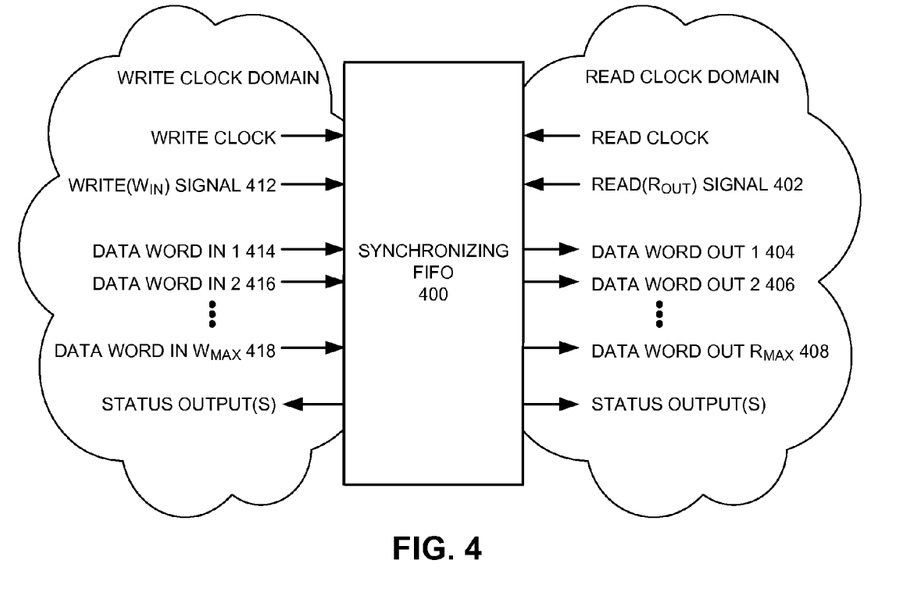
FIG. 4 illustrates exemplary top-level signals available to a writer and reader in an exemplary implementation of a synchronizing FIFO that allows any number of FIFO stages to be read from or written to simultaneously in accordance with an embodiment.

FIG. 4 illustrates exemplary top-level signals available to a writer (or sender) and reader (or receiver) in an exemplary implementation of a synchronizing FIFO 400 that allows multiple FIFO stages to be read from or written to simultaneously. The read and write signals (402, 412) specify how many reads and writes should occur in their next (respective) clock cycles (as indicated in FIG. 4 by the variables "($N_{OUT}$)" and "($N_{IN}$)"). Synchronizing FIFO 400 includes multiple data input (414-418) and data output (404-408) ports (e.g., one for each potential parallel write and read). $N_{OUT}$ and $N_{IN}$ are bounded by the capacity of synchronizing FIFO 400 and/or the number of input/output ports available for synchronizing FIFO 400 (e.g., '$w_{MAX}$' and '$R_{MAX}$', respectively, which may be equal to or less than the capacity 'M' of synchronizing FIFO 400), and may vary across subsequent read and/or write operations. Note that the number of parallel input words being accessed during a given write operation may be different from the number of parallel output words being accessed by a simultaneous read operation, and that the size of input and output data words may be different (e.g., the write clock domain may write 8-bit data words to synchronizing FIFO 400, and the read clock domain may read 32-bit data words from synchronizing FIFO 400, in which case every read from the FIFO would correspond to four writes to the FIFO). The internal FIFO data store may comprise an array of flip-flops, an array of latches, an SRAM, or any other data-holding elements. While the physical implementation of the data store can be one uniform block, logically a FIFO's data store is subdivided into stages (or rows) that correspond to each FIFO stage. In an exemplary implementation where '$w_{MAX}$' and '$R_{MAX}$' equal the capacity of the synchronizing FIFO (and input data words are the same size as data output words), each data input word is connected to each stage of the data store, and each data output word is connected to each stage of the data store.

Note that, in practice, the additional overhead associated with supporting a large number of simultaneous reads and/or writes may increase circuit complexity and delay, and grows as the number of stages in the synchronizing FIFO increases. For instance, because every data port needs to be able to access the registers of every FIFO stage, the synchronization circuit may need cross-bar switches that can route data from the ports of each respective clock domain to any target register. Such a cross-bar can involve substantial additional circuitry and complexity. As a result, some embodiments may limit the maximum number of parallel reads and writes per clock cycle (e.g., only allow 0-3 stages to be written or read in a given clock cycle) or involve additional routing techniques that attempt to reduce such complexity and delays.

In some embodiments, the synchronization circuit uses a unary encoding of the status outputs (e.g., a set of stage empty and stage full signals) of the FIFO stages to determine whether a request to read or write multiple FIFO stages can be accommodated. For instance, the synchronization circuit may combine the stage status outputs into a vector of bits that is inspected to determine whether a given read or write request can be accommodated given the present contents of the synchronized FIFO stages. Such a "redundant representation" may involve more bits of storage than a Gray-encoded pointer (e.g., use more bits than would strictly be necessary in a minimal encoding), but thereby facilitate supporting a variable number of parallel accesses. Note that this unary encoding is used in conjunction with read and write pointers that indicate the "current" source and target stages (e.g., the pointers indicate the next stage that should be read from and the next stage that should be written to, to maintain proper FIFO ordering).

Note that in some embodiments a range of protocols and implementations may be used when initiating and servicing a multi-stage access. For instance:

The status outputs for the synchronizing FIFO may provide a number of bits (e.g. a unary or a $\log_2(M)$ set of bits) that indicate the number of stages that are empty or full. In some embodiments, a reader (or writer) will only attempt to read (write) n stages if n full (empty) stages are indicated by the status outputs. Initiating such a request may otherwise cause a failure (i.e., FIFO behavior may be unspecified if a request is made when the output signals indicate such a request cannot be satisfied).

In some embodiments, when insufficient full (or empty) stages are available for a desired multi-stage access, a requestor may still be configured to send a request, and the FIFO may perform the desired operation for the number of stages available and use status output signals to indicate that a number of data words were not read or written (and/or the number of data words that were not read or written).

The status outputs for the synchronizing FIFO may include a "write completed" (and/or "read completed") signal. In some embodiments, if a sufficient number of full (or empty) stages are available for the desired operation, the operation is performed, and the appropriate "completed" signal is asserted. If not, a range of possible implementations may be used. For instance, the FIFO may: 1) delay until sufficient stages are available for the desired operation; and then 2) perform the desired operations and assert the appropriate "completed" signal. Alternatively, in some embodiments, a requester not receiving a "completed" signal (or receiving some other signal) may be given the option to withdraw its request, thereby leaving the FIFO in the same state that it was in before the operation was attempted.

In some embodiments, when insufficient full (or empty) stages are available for a desired operation, the FIFO may: 1) initially perform as many accesses as possible based on the current FIFO state; 2) buffer the remaining portion of the requested operation; and 3) complete the operation and assert an appropriate "completed" signal when sufficient stages are available. Note that this protocol could avoid deadlock in situations where a FIFO without such partial-write/read capabilities might deadlock. Note also that this and the preceding examples are exemplary, and that a range of such techniques and combinations thereof could be implemented in a synchronizing FIFO.

Figure 5:
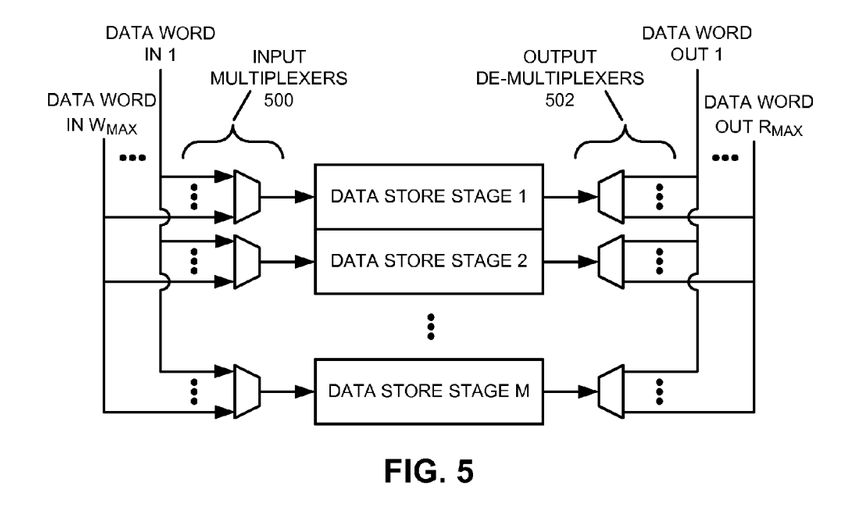
FIG. 5 illustrates an exemplary implementation of a synchronizing FIFO that uses multiplexers and de-multiplexers to connect FIFO stages to their inputs and outputs in accordance with an embodiment.

FIG. 5 illustrates an exemplary implementation of a synchronizing FIFO that uses multiplexers and de-multiplexers (500-502) to connect FIFO stages to their data inputs and outputs. Note that such multiplexing may be implemented using a range of hardware structures (e.g., tri-stated inverters or pass-gates). Assuming that the write pointer indicates that FIFO stage x is the next stage that should be written to, that the FIFO length is M, and that a write($w_{IN}$) signal is issued from the sender (where $w_{IN}$ is less than or equal to $w_{MAX}$, the maximum number of FIFO stages that can be written at once), the inputs are routed through multiplexers 500 as follows:

If $w_{IN}$ is zero, no write request is issued.

If the stage full signals for all M stages between stage x and stage (x+$w_{IN}$−1) mod M are low, then:
route data word in 1 to data store stage x;
route data word in 2 to stage (x+1) mod M;
...;
route data word in $w_{IN}$ to stage (x+$w_{IN}$−1) mod M; and
not route any other inputs.

If stage x or any of the ($w_{IN}$−1) stages that logically follow stage x are outputting a high stage full signal, then the write request may or may not be issued, depending on the implementation and protocols of the synchronizing FIFO (as described above).

The control signals for the output de-multiplexers 502 are generated in a similar fashion. As described above, some alternative implementations may allow the request to still be issued, and allow k data items (where k<$w_{IN}$, and k empty stages are available) to be written if $w_{IN}$ empty stages are not available.

Note that while the exemplary embodiment illustrated in FIG. 5 uses M multiplexers 500 and M de-multiplexers 502, alternative embodiments may reduce the number of multiplexing devices (e.g., in an attempt to reduce the number of transistors, gates, and wire-crossings associated with $M*w_{MAX}$ inputs and $M*R_{MAX}$ outputs). For instance, a circuit at the inputs of the FIFOs could cyclically rotate the $w_{MAX}$ inputs using a hardware cross-bar (which uses $O(w_{MAX})$ hardware) or trees of multiplexers (which still involve $O(w_{MAX}^2)$ wire-crossings but only $O(w_{MAX} \log(w_{MAX}))$ gates/transistors). In such embodiments, the $i^{th}$ synchronized data storage location has its data input connected to the i mod $w_{MAX}$ output of the rotator, such that each output of the rotator drives the data input of M div $w_{MAX}$ synchronized data storage locations. Controlling the write-enables of the storage locations ensures that each input data word is written to the correct location. Such alternative organizations can substantially reduce the number of multiplexers that are needed as the value of $w_{MAX}$ grows. Note that similar techniques can be used to reduce the number of de-multiplexers needed to produce the data outputs of the FIFO.

Figure 6:
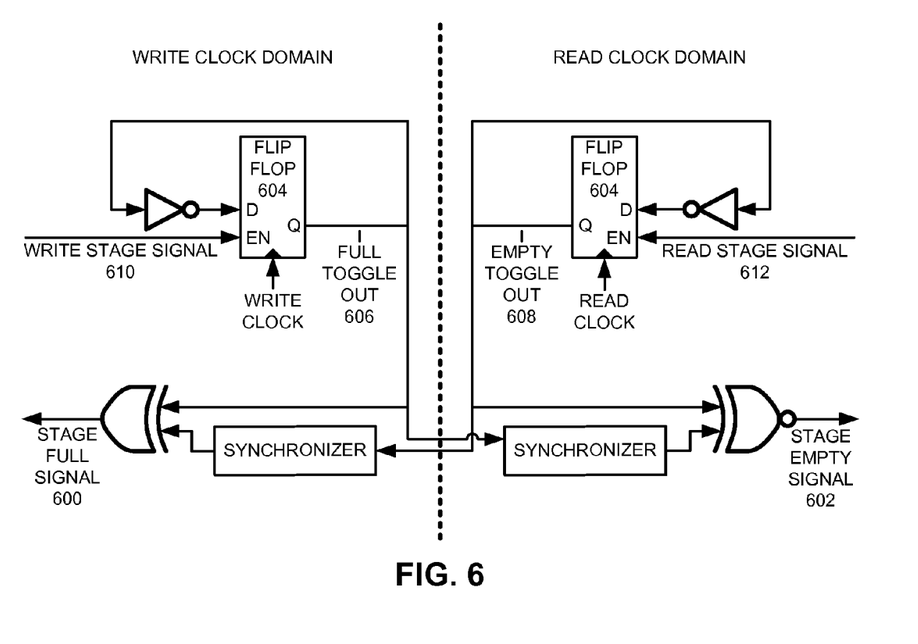
FIG. 6 illustrates an exemplary implementation of a FIFO stage control block that manages the synchronization of the per-stage full and empty signals in accordance with an embodiment.

FIG. 6 illustrates an exemplary implementation of a FIFO stage control block that manages the synchronization of the per-stage full and empty signals (600-602). Flip flops 604 are configured to only transfer the word value at input port D to output port Q if the enable signal at port EN is high. Each FIFO stage includes such a control block, and all FIFO stages are configured to initialize with full toggle out 606 and empty toggle out 608 to be set to the same value (thereby indicating an empty FIFO stage). A write to a FIFO stage asserts write stage signal 610, thereby changing the full toggle out signal 606, which in turn raises stage full signal 600 and (after a synchronizer delay) lowers stage empty signal 602. The read stage signal 612 from a subsequent read request returns the value of the empty toggle out signal 608 to the same value as the full toggle out signal 606, thereby raising stage empty signal 602 and (after a synchronizer delay) lowering stage full signal 600.

Assuming that the write pointer points to FIFO stage x, that the FIFO length is M, and that a write($w_{IN}$) signal is issued from the sender, the write stage signals for a synchronizing FIFO can be generated as follows:

If $w_{IN}$ is zero, no write request is issued, and all write stage signals are low.

If the stage full signals for all $w_{IN}$ stages between stage x and stage $(x+w_{IN}-1)$ mod M are low, then set the write stage signals for those stages to high. The write stage signals for all other stages should be set to low.

If stage x or any of the $(w_{IN}-1)$ stages after stage x are outputting a high stage full signal, then the write request may or may not be issued depending on the implementation and protocols of the synchronizing FIFO (as described above).

The read stage signals for the synchronizing FIFO can be generated in a similar fashion. As described above for FIG. 5, some alternative implementations may allow k data items (where $k<W_{IN}$, and k empty stages are available) to be written if $w_{IN}$ empty stages are not available.

Figure 7:
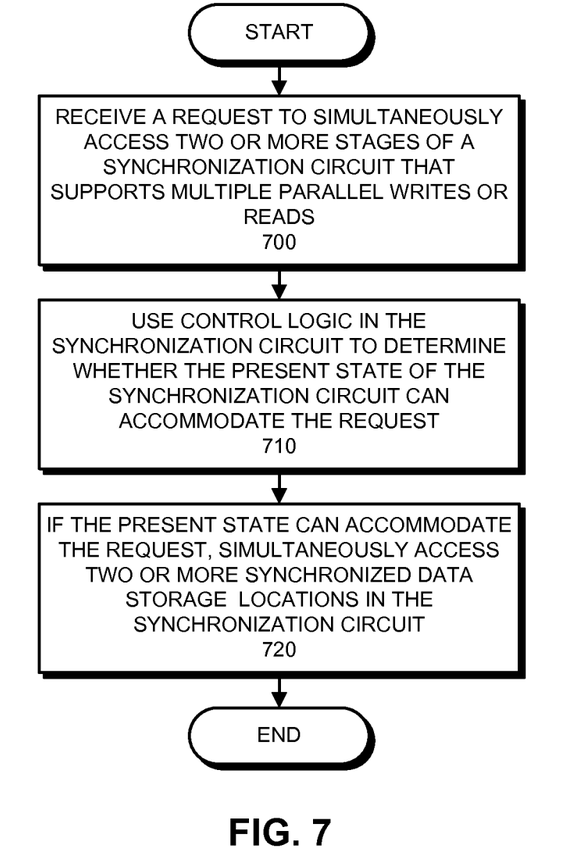
FIG. 7 presents a flow chart that illustrates the process of using a synchronization circuit that supports multiple parallel reads and writes in accordance with an embodiment.

FIG. 7 presents a flow chart that illustrates the process of using a synchronization circuit that supports multiple parallel reads and writes. This synchronization circuit includes multiple coupled data storage locations that synchronize data and control signals between two time domains and control logic that facilitates simultaneously accessing a variable number of such synchronized data storage locations in parallel in the same clock cycle. During operation, the synchronization circuit receives a request to simultaneously access (e.g., read and/or write) two or more synchronized data storage locations (operation 700). In response to the request, the control logic in the synchronization circuit determines whether the present state of the synchronization circuit can accommodate the request (operation 710), and if so, simultaneously accesses the two or more synchronized data storage locations (operation 720).

An earlier example described how a pointer-based FIFO that uses binary-encoded pointers can lead to sampling wrong pointer values (and, thus, to FIFO failure). However, if each FIFO stage has its own flag indicating whether it is full or empty, any number of such flags can change at a given time. After a set of simultaneous accesses, the status values output by some FIFO stages may update more quickly than those of other FIFO stages (e.g., the synchronizers of some stages may update their status output earlier than others), while other stages may continue to output stale status information for one or more clock cycles. However, while such timing mismatches may lead to some additional delay, they do not lead to invalid accesses.

For instance, consider the following scenario, in which the notation "<x, x, x, x>" serves as a unary encoding of the status information for a four-stage synchronizing FIFO, and where each x can be either '0' (indicating an empty stage) or '1' (indicating a full stage). An empty FIFO is thus described by <0,0,0,0>. Note that the FIFO may use different write and read clocks, and thus that there may be a synchronization delay between when a FIFO stage's state changes and when that state change becomes visible to the write or read clock domain. When two data items are written to the empty FIFO in parallel (starting at the "current" target stage, which is initially represented by the leftmost position), the FIFO state becomes <1,1,0,0>. However, because the write happens in a different clock domain from the read, the read domain may sample the FIFO state just as the two FIFO stage's states are changing, and only detect the second of the two writes in the new state (e.g., the read domain detects a state <0,1,0,0>). This situation can be handled in a number of ways that correctly make use of such sampled state.

In one embodiment, the current FIFO stage's stage empty signal alone determines the status of the FIFO empty signal. In this embodiment, this means that (for the above example) the next source FIFO stage for the reader, which is the leftmost stage, is regarded as empty. Thus, in this example the FIFO empty signal would stay high, the reader would not look beyond the current source stage, and no data is read out from the FIFO. In other words, even though the internal signals indicate that there is a full stage available, the FIFO reader will not detect this until that full stage is the current source stage. Note that this is not an issue for correctness, because FIFO correctness does not depend on data being read out as fast as possible; rather, correctness requires that invalid data should never be read out and that valid data should never be overwritten. The reader will sample the FIFO again in a subsequent read clock, at which point the first stage's state will be sampled as being full (<1,1,0,0>), and the reader can proceed to read out one or two data items.

In alternative embodiments, all of the stage empty signals from the FIFO stages are combined using a structure such as an OR-tree (described in more detail below), such that if any FIFO stage is not empty, the FIFO empty signal falls. Thus, based on the above-sampled state, <0,1,0,0>, the FIFO empty signal would fall, indicating to a reader that there is data available in the FIFO. However, because the current source stage (e.g., the stage which should be read next) is represented by the leftmost position, the reader would read out data from that leftmost position, even though the stage's stage empty signal is low. This is not erroneous, because there must be valid data in the corresponding FIFO stage for its successor stage (represented by the second bit in the notation) to contain valid data; the synchronizers just have not conveyed the updated status yet. Basically, any high value for a stage indicates that the other stages preceding that stage (until one reaches the read pointer) contain data.

Figure 8:
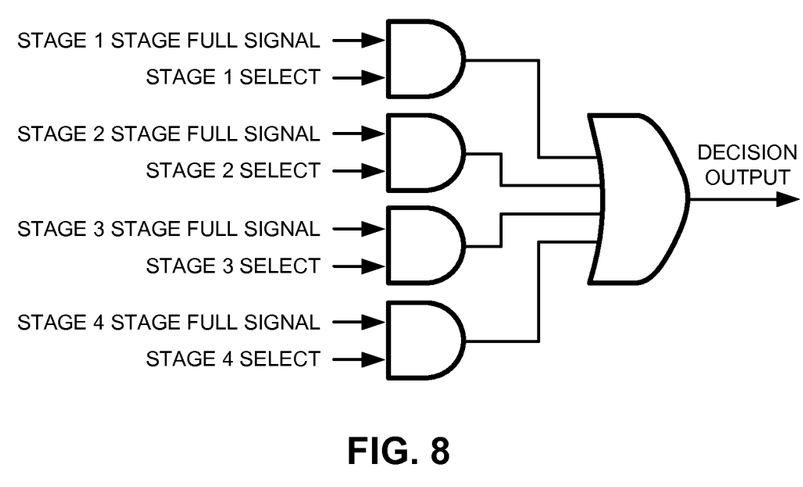
FIG. 8 illustrates an exemplary OR-tree that can is used to decide whether a read request can be accommodated by a FIFO with four synchronized data storage locations in accordance with an embodiment.

FIG. 8 illustrates an exemplary OR-tree that can be used to decide whether a read request can be accommodated by a FIFO with four synchronized data storage locations. Note that such a structure can be constructed to support either of the above-described embodiments (e.g., either to require that all needed stages are explicitly ready, or instead to find a set stage full bit either for or beyond the last stage being accessed during a given read). The control logic can selectively activate the stage select signals input into the AND gates to specify the stage full signals that should be considered for a given decision (e.g., based on the value of the read and write pointers and how many stages the current request is attempting to access). Note that the decision logic can be implemented using a wide range of techniques, and is in no way limited to the illustrated implementation.

Note that while some of the preceding examples emphasize the process and correctness of writing to a synchronizing FIFO that supports a variable number of parallel reads and/or writes, the same principles and techniques also apply to reading from the synchronizing FIFO.

Some of the described embodiments of synchronizing FIFOs use a unary encoding of status outputs that uses more storage elements (and thus more circuit area) than Gray-pointer-based designs. For instance, Gray pointers typically involve log n bits for each pointer (where n is the number of entries in the FIFO), while the unary encoding described in some of the preceding examples uses n bits to store state information. However, as long as the data words stored by the FIFO are sufficiently wide, this additional storage overhead is relatively minor (for reasonably small FIFOs). Furthermore, this additional storage overhead is also balanced by simpler control logic; the logic needed to compare two Gray-encoded pointers to determine whether it is safe to read from or write to a FIFO is typically much more complicated than the control logic used to determine whether stages are empty or full in the described synchronization circuit. This simplified logic allows the cycle time of the described synchronization FIFO to be shorter.

In some embodiments, a small synchronization FIFO is used in conjunction with a second, larger data-buffering queue. Designers often strive to overload a single queue with both synchronization and data-buffering capabilities. However, such efforts may result in performance compromises. For instance, data-buffering needs often call for larger queue sizes, but such larger queue sizes can increase synchronization overhead (e.g., by increasing the storage resources needed for a unary encoding or by increasing the number of data read and write ports in the FIFO). Separating synchronization from data buffering can reduce such overhead. For instance, some designs may pair a large, efficient FIFO queue for data buffering within the clock domain with a smaller synchronization FIFO queue that handles clock domain crossings.

In summary, embodiments of the present invention involve structures and techniques that facilitate synchronizing signals among different time domains in a manner that supports a variable number of parallel reads and/or writes. A synchronizing FIFO comprises a number of synchronized FIFO stages, each of which includes synchronizers that indicate whether the stage is empty or full. The control logic for the synchronizing FIFO analyzes the status information output by the per-stage synchronizers to determine whether requests that seek to simultaneously access multiple FIFO stages can be accommodated.

Computing Environment

Figure 9:
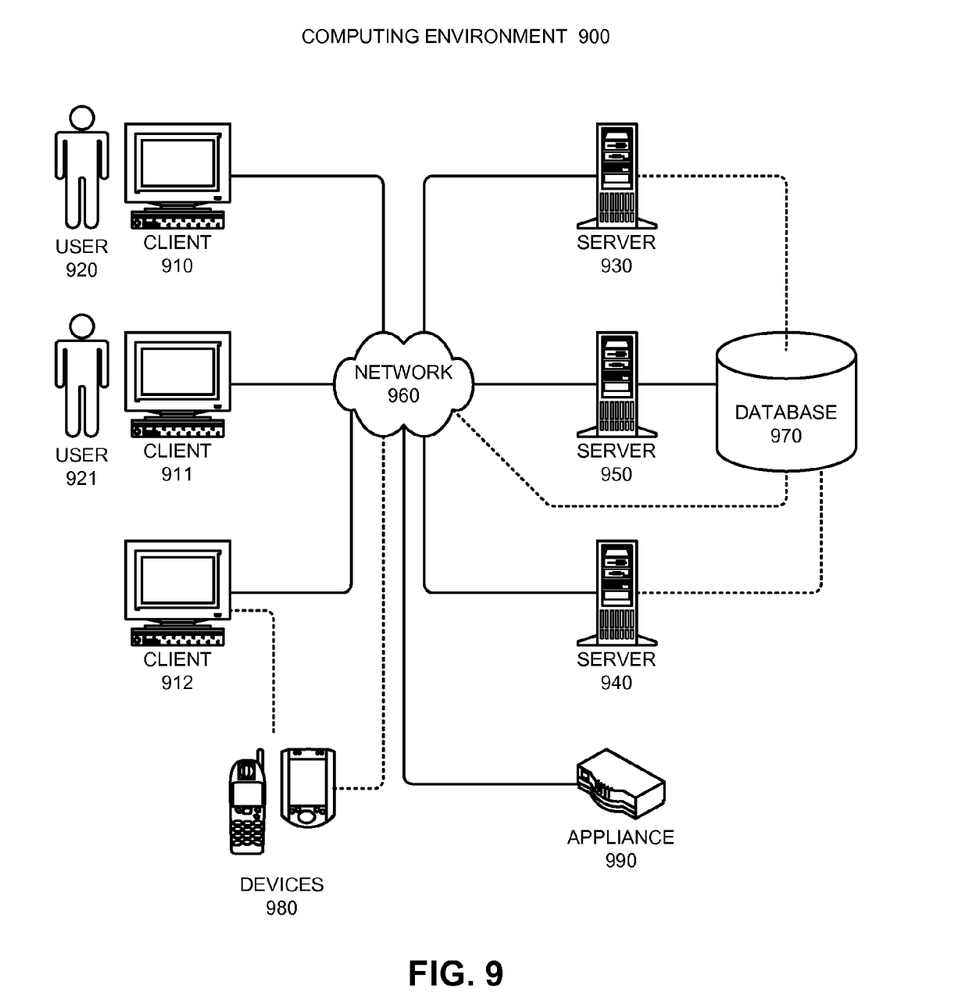
FIG. 9 illustrates a computing environment in accordance with an embodiment.

In some embodiments of the present invention, synchronization circuits and techniques can be incorporated into a wide range of computing devices in a computing environment. For example, FIG. 9 illustrates a computing environment 900 in accordance with an embodiment of the present invention. Computing environment 900 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 9, computing environment 900 includes clients 910-912, users 920 and 921, servers 930-950, network 960, database 970, devices 980, and appliance 990.

Clients 910-912 can include any node on a network that includes computational capability and includes a mechanism for communicating across the network. Additionally, clients 910-912 may comprise a tier in an n-tier application architecture, wherein clients 910-912 perform as servers (servicing requests from lower tiers or users), and wherein clients 910-912 perform as clients (forwarding the requests to a higher tier).

Similarly, servers 930-950 can generally include any node on a network including a mechanism for servicing requests from a client for computational and/or data storage resources. Servers 930-950 can participate in an advanced computing cluster, or can act as stand-alone servers. For instance, computing environment 900 can include a large number of compute nodes that are organized into a computing cluster and/or server farm. In one embodiment of the present invention, server 940 is an online "hot spare" of server 950.

Users 920 and 921 can include: an individual; a group of individuals; an organization; a group of organizations; a computing system; a group of computing systems; or any other entity that can interact with computing environment 900.

Network 960 can include any type of wired or wireless communication channel capable of coupling together computing nodes. This includes, but is not limited to, a local area network, a wide area network, or a combination of networks. In one embodiment of the present invention, network 960 includes the Internet. In some embodiments of the present invention, network 960 includes phone and cellular phone networks.

Database 970 can include any type of system for storing data in non-volatile storage. This includes, but is not limited to, systems based upon magnetic, optical, or magneto-optical storage devices, as well as storage devices based on flash memory and/or battery-backed up memory. Note that database 970 can be coupled: to a server (such as server 950), to a client, or directly to a network. In some embodiments of the present invention, database 970 is used to store information related to diagnostic information and/or diagnostic formatters. Alternatively, other entities in computing environment 900 may also store such data (e.g., servers 930-950).

Devices 980 can include any type of electronic device that can be coupled to a client, such as client 912. This includes, but is not limited to, cell phones, personal digital assistants (PDAs), smartphones, personal music players (such as MP3 players), gaming systems, digital cameras, portable storage media, or any other device that can be coupled to the client. Note that, in some embodiments of the present invention, devices 980 can be coupled directly to network 960 and can function in the same manner as clients 910-912.

Appliance 990 can include any type of appliance that can be coupled to network 960. This includes, but is not limited to, routers, switches, load balancers, network accelerators, and specialty processors. Appliance 990 may act as a gateway, a proxy, or a translator between server 940 and network 960.

Note that different embodiments of the present invention may involve different system configurations, and are not limited to the system configurations illustrated in computing environment 900. In general, any device that includes a synchronization circuit may incorporate elements of the present invention.

In some embodiments of the present invention, some or all aspects of a synchronization circuit can be implemented as dedicated hardware modules. These hardware modules can include, but are not limited to, processor chips, application-specific integrated circuit (ASIC) chips, field-programmable gate arrays (FPGAs), memory chips, and other programmable-logic devices now known or later developed. Alternatively, some or all of the described synchronization operations may be performed using general-purpose circuits in a processor using processor instructions.

In these embodiments, when the external hardware modules are activated, the hardware modules perform the methods and processes included within the hardware modules. For example, in some embodiments of the present invention, the hardware module includes one or more dedicated circuits for performing the described synchronization operations. As another example, in some embodiments of the present invention, the hardware module is a general-purpose computational circuit (e.g., a microprocessor or an ASIC), and when the hardware module is activated, the hardware module executes program code (e.g., BIOS, firmware, etc.) that configures the general-purpose circuits to perform the operations described above.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a synchronization circuit that supports multiple parallel reads and writes, comprising:
    receiving a request to access two or more stages of the synchronization circuit from a first time domain, wherein the synchronization circuit comprises multiple data storage locations that synchronize data and control signals between the first time domain and a second time domain;
    using control logic in the synchronization circuit to determine whether a present state of the synchronization circuit can accommodate the request, wherein the control logic facilitates simultaneously accessing a variable number of synchronized data storage locations in a single clock cycle of the first time domain; and
    if so, simultaneously accessing two or more synchronized data storage locations in the synchronization circuit,
    wherein each synchronized data storage location in the synchronized data storage locations comprises a data-holding element that stores a FIFO word and two one-bit synchronizers that indicate to the first time domain and the second time domain whether the synchronized data storage location is empty or full.

2. The method of claim 1, wherein the request includes a read request that attempts to simultaneously read values from two or more stages of the synchronization circuit.

3. The method of claim 1, wherein the request includes a write request that attempts to simultaneously write values to two or more stages of the synchronization circuit.

4. The method of claim 1, wherein an ordering of data that is stored in the synchronization circuit is not affected by requests that simultaneously access multiple synchronized data storage locations.

5. The method of claim 1, wherein the synchronization circuit uses a redundant representation to track whether the synchronized data storage locations are full or empty.

6. The method of claim 5,
    wherein the redundant representation includes a unary vector comprised of outputs of the one-bit synchronizers for the synchronized data storage locations; and
    wherein the unary vector is used by the synchronization circuit to determine whether the present state of the synchronization circuit can accommodate the request.

7. The method of claim 6,
    wherein the outputs of one-bit synchronizers for different synchronized data storage locations which are being accessed simultaneously during the request update at different times subsequent to the request; and
    wherein, upon receiving a subsequent request that targets a specific synchronized data storage location, the synchronization circuit inspects bits in the unary vector that are associated with synchronized data storage locations subsequent to the specific synchronized data storage location to determine whether the subsequent request can be accommodated.

8. The method of claim 6,
    wherein the outputs of one-bit synchronizers for different synchronized data storage locations being accessed simultaneously during the request update at different times subsequent to the request; and
    wherein, upon receiving a subsequent request that targets a specific synchronized data storage location, the synchronization circuit delays the associated access until the output bit in the unary vector associated with the specific synchronized data storage location indicates that the subsequent request can be accommodated.

9. The method of claim 1, wherein each synchronized data storage location is configured with a number of access ports that corresponds to the maximum number of synchronized data storage locations that can be simultaneously accessed in the clock cycle.

10. A synchronization circuit, comprising:
    multiple coupled synchronized data storage locations configured to synchronize data and control signals between a first time domain and a second time domain; and
    control logic, coupled to the synchronized data storage locations, configured to facilitate simultaneous access to a variable multiple number of the synchronized data storage locations in a single clock cycle;
    wherein the synchronization circuit is configured to:
        receive a request from the first time domain to access two or more stages of the synchronization circuit;
        use the control logic to determine whether a present state of the synchronization circuit can accommodate the request; and
        if so, simultaneously access two or more synchronized data storage locations in the synchronization circuit in a single clock cycle of the first time domain,
    wherein each synchronized data storage location in the synchronized data storage locations comprises a data-holding element that stores a FIFO word and two one-bit synchronizers that indicate to the first time domain and the second time domain whether the synchronized data storage location is empty or full.

11. The synchronization circuit of claim 10, wherein an ordering of data that is stored in the synchronization circuit is not affected by requests that simultaneously access multiple synchronized data storage locations.

12. The synchronization circuit of claim 10, wherein the synchronization circuit uses a redundant representation to track whether the synchronized data storage locations are full or empty.

13. The synchronization circuit of claim 12,
    wherein the redundant representation includes a unary vector comprised of outputs of the one-bit synchronizers for the synchronized data storage locations; and
    wherein the unary vector is used by the synchronization circuit to determine whether the present state of the synchronization circuit can accommodate the request.

14. The synchronization circuit of claim 13,
    wherein the outputs of one-bit synchronizers for different synchronized data storage locations which are being accessed simultaneously during the request update at different times subsequent to the request; and
    wherein, upon receiving a subsequent request that targets a specific synchronized data storage location, the synchronization circuit inspects bits in the unary vector that are associated with synchronized data storage locations subsequent to the specific synchronized data storage location to determine whether the subsequent request can be accommodated.

15. The synchronization circuit of claim 13,
wherein the outputs of one-bit synchronizers for different synchronized data storage locations being accessed simultaneously during the request update at different times subsequent to the request; and
wherein, upon receiving a subsequent request that targets a specific synchronized data storage location, the synchronization circuit delays the associated access until the output bit in the unary vector associated with the specific synchronized data storage location indicates that the subsequent request can be accommodated.

16. The synchronization circuit of claim 10, wherein each synchronized data storage location is configured with a number of access ports that corresponds to the maximum number of synchronized data storage locations that can be simultaneously accessed in the clock cycle.

17. A computer system comprising an integrated circuit, wherein the integrated circuit includes a synchronization circuit that comprises:
multiple coupled data storage locations configured to synchronize data and control signals between a first time domain and a second time domain; and
control logic, coupled to the synchronized data storage locations, configured to facilitate simultaneous access to a variable multiple number of the synchronized data storage locations in a single clock cycle;
wherein the synchronization circuit is configured to:
receive a request from the first time domain to access two or more stages of the synchronization circuit;
use the control logic to determine whether a present state of the synchronization circuit can accommodate the request; and
if so, simultaneously access two or more synchronized data storage locations in the synchronization circuit in a single clock cycle of the first time domain,
wherein each synchronized data storage location in the synchronized data storage locations comprises a data-holding element that stores a FIFO word and two one-bit synchronizers that indicate to the first time domain and the second time domain whether the synchronized data storage location is empty or full.

18. The computer system of claim 17, wherein an ordering of data that is stored in the synchronization circuit is not affected by requests that simultaneously access multiple synchronized data storage locations.

19. The method of claim 1, wherein, for each synchronized data storage location, indicating whether the synchronized data storage location is empty comprises generating an empty signal for the synchronized data storage location using at least one of the one-bit synchronizers, and
wherein the method further comprises determining an empty signal for the synchronization circuit based on only one of the empty signals for the synchronized data storage locations, wherein the only one of the empty signals comprises the empty signal for a current location in the synchronized data storage locations.

20. The method of claim 1, wherein, for each synchronized data storage location, indicating whether the synchronized data storage location is empty comprises generating an empty signal for the synchronized data storage location using at least one of the one-bit synchronizers, and
wherein the method further comprises determining an empty signal for the synchronization circuit by combining the empty signals for the synchronized data storage locations.

* * * * *

UNITED STATES PATENT AND TRADEMARK OFFICE
CERTIFICATE OF CORRECTION

| | |
|---|---|
| PATENT NO. | : 8,631,265 B2 |
| APPLICATION NO. | : 12/966888 |
| DATED | : January 14, 2014 |
| INVENTOR(S) | : Ono et al. |

It is certified that error appears in the above-identified patent and that said Letters Patent is hereby corrected as shown below:

In the Specification:

In column 6, line 30, delete "($N_{IN}$")." and insert -- ($N_{IN}$)". --, therefor.

In column 8, line 23, delete "not" and insert -- do not --, therefor.

Signed and Sealed this
Fifteenth Day of July, 2014

Michelle K. Lee
*Deputy Director of the United States Patent and Trademark Office*